(12) United States Patent
Rudi (10) Patent No.: US 12,472,442 B2
(45) Date of Patent: Nov. 18, 2025

(54) METHODS AND SYSTEMS FOR ASSISTIVE CHAT INTERACTIVITY

(71) Applicant: Sony Interactive Entertainment Inc., Tokyo (JP)

(72) Inventor: Olga Rudi, San Francisco, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 369 days.

(21) Appl. No.: 17/976,615

(22) Filed: Oct. 28, 2022

(65) Prior Publication Data
US 2024/0139635 A1 May 2, 2024

(51) Int. Cl.
*A63F 13/87* (2014.01)
*A63F 13/213* (2014.01)
(Continued)

(52) U.S. Cl.
CPC ............ *A63F 13/87* (2014.09); *A63F 13/213* (2014.09); *A63F 13/215* (2014.09); *G06F 3/012* (2013.01);
(Continued)

(58) Field of Classification Search
CPC ...... A63F 13/87; A63F 13/213; A63F 13/215; A63F 13/35; A63F 13/533; A63F 13/67;
(Continued)

(56) References Cited

U.S. PATENT DOCUMENTS

| | | |
|---|---|---|
| 2013/0123019 A1 | 5/2013 | Sullivan et al. |
| 2013/0212190 A1 | 8/2013 | Patil |

(Continued)

FOREIGN PATENT DOCUMENTS

| | | |
|---|---|---|
| EP | 3491781 B1 | 8/2020 |
| WO | 2012174299 A2 | 12/2012 |
| WO | 2012174299 A3 | 12/2012 |

OTHER PUBLICATIONS

PCT/US2023/076002 Notification of Transmittal of the International Search Report and the Written Opinion of the International Searching Authority, or the Declaration, PCT/ISA/220, and the International Search Report, PCT/ISA/210, Jan. 25, 2024.
(Continued)

*Primary Examiner* — Peter J Iannuzzi
(74) *Attorney, Agent, or Firm* — Kilpatrick Townsend & Stockton LLP (57) ABSTRACT

Methods and systems are provided for rendering assistive chat during play of a video game. An example method includes tracking a gaze of a first player interacting with a scene of an environment of the video game. The method includes identifying a gaze focus of the first player. The gaze focus is toward a character in the scene. The character is associated with a second player. The method includes processing state data of the environment to identify an event occurring in the environment of the video game. The method includes surfacing an indicator to the first player that is suggestive of participating in a chat communication with the second player. The surfacing is configured to be triggered responsive to the gaze focus being toward the character and the identified event.

20 Claims, 5 Drawing Sheets

(51) Int. Cl.
  *A63F 13/215* (2014.01)
  *G06F 3/01* (2006.01)
  *G06F 40/58* (2020.01)
  *G10L 15/26* (2006.01)

(52) U.S. Cl.
  CPC .............. *G06F 3/013* (2013.01); *G06F 40/58* (2020.01); *G10L 15/26* (2013.01)

(58) Field of Classification Search
  CPC .......... G06F 3/012; G06F 3/013; G06F 40/58; G10L 15/26
  See application file for complete search history.

(56) References Cited

U.S. PATENT DOCUMENTS

| | | | |
|---|---|---|---|
| 2016/0218997 A1 | 7/2016 | Patil | |
| 2018/0034867 A1* | 2/2018 | Zahn | ................. G06F 3/011 |
| 2018/0367484 A1* | 12/2018 | Rodriguez | ............. H04L 67/75 |
| 2021/0339134 A1* | 11/2021 | Knoppert | ................ A63F 13/26 |

OTHER PUBLICATIONS

XP093119623,https://web.archive.org/web/20220620095327/https://techcommunity.microsoft.com/t5/microsoft-teams/suggested-replies-started-showing-up-in-the-teams-desktop-app/m-p/3297661 retrieved Jan. 15, 2024, p. 1.

\* cited by examiner

FIG. 1A

Player 1 (P1)

FIG. 1B

Player 2 (P2)

METHODS AND SYSTEMS FOR ASSISTIVE CHAT INTERACTIVITY

1. FIELD OF THE DISCLOSURE

The present disclosure relates generally to computer implemented methods that assist users to initiate and conduct chat interactivity during gameplay of a video game.

BACKGROUND

2. Description of the Related Art

The video game industry has seen many changes over the years. Users are now able to play video games using many types of peripherals and computing devices. Sometimes video games are played using a game console, where the game console is responsible for processing the game and generating the interactive input presented on display screens. Other times, video games are played in streaming mode, where a server or servers execute the game remotely and users provide input over a network connected device.

Although the hardware and peripheral devices used for playing video games have continued to increase in number and variation, there still is a need to facilitate the communication of user input. Most user input is made using a peripheral device, e.g., a game controller or mouse/keyboard. However, some users are not able to engage in communication in a time or context efficient way. These limitations may be due to non-familiarity of a game environment or some physical handicap of the user.

It is in this context that implementations of the disclosure arise.

SUMMARY

Implementations of the present disclosure include methods, systems, and devices for providing chat assistance during gameplay of a game. The assistance is provided, in one embodiment, as a graphical indicator on the display of a first player. The graphical display may provide text that suggests to the first player to initiate chat communication with a second player. The method includes tracking a gaze focus of the first player and events occurring in the gameplay. Based on processing the gaze focus and the events, the method is configured to surface an indicator that suggests initiating chat communication with a second player. In one embodiment, the second player is associated with a game character.

If the gaze focus is directed toward the game character, for example, and an event is occurring that would benefit chat between the first player and the second player, the method may surface the indicator the first player. In one configuration, the indicator will suggest the chat, and in other embodiments, the suggestion may include suggested text content to the first player to send to the second player. The suggested text content, in one configuration, may be contextually related to the game and/or the event detected in the game.

In one embodiment, a method is configured to provide assistive chat during play of a video game. The method includes tracking a gaze of a first player interacting with a scene of an environment of the video game. The method includes identifying a gaze focus of the first player. The gaze focus is toward a character in the scene. The character is associated with a second player. The method includes processing state data of the environment to identify an event occurring in the environment of the video game. The method includes surfacing an indicator to the first player that is suggestive of participating in a chat communication with the second player. The surfacing is configured to be triggered responsive to the gaze focus being toward the character and the identified event.

In one embodiment, the method includes receiving an accept response from the first player to participate in the chat communication with the second player and then activating a chat channel between the first play and the second player.

In some embodiments, while the chat channel is active, the method includes capturing voice output by the first player, the voice output is processed to text and included in a chat interface viewable by the second player.

In some embodiments, the method includes processing the voice output includes translating the voice output to a game specific format.

In some embodiments, determining that the gaze focus is toward the character in the scene includes analyzing a predictive cue of the first player. The predictive cue includes data associated with the first player moving the gaze focus to track the character in the scene for a threshold period of time. In one example, a predictive cue can be processed based on tracking body movements of the player, face movements, winking, eye brow motions, head turns, leaning in closer to the screen or device, words spoken, gestures made by the player's head, body, arms or controller, or combinations of two or more thereof.

In some embodiments, a predictive cue includes data associated with head movements of the first player while the gaze focus is toward the character.

In some embodiments, the event is contextually related to interactivity in the video game by the first player and the second player.

In some embodiments, the indicator includes text viewable by the first player, and the text includes recommended chat content to be used in the chat communication.

In some embodiments, the recommended chat content includes one or both of text and graphics. The recommended chat content is related further contextually related to the interactivity in the video game.

In some embodiments, the state data is processed by a machine learning algorithm to identify said event and other events. The machine learning algorithm is trained using prior gameplays of the game by one or more users.

In some embodiments, the indicator is one of a message, graphical user interface, an icon, a graphic, a graphic and audio tone, an audio sound, a banner, a haptic feedback to a controller of the first player, or a combination of two or more thereof.

In some embodiments, the gaze focus of the first player is captured using one or more cameras.

In some embodiments, the method includes continuing to surface said indicator one or more times during gameplay of the video game.

In another embodiment, eye tracking is used to select some object on a display and then capture voice output from a player. In some embodiments, a user's eye gaze is used to identify and select another player in a game to talk to. The embodiments includes using cues of game play to determine if the user wishes to have a conversation with another player. For example, if the user's eye gaze is focused on another player for a period of time when the context of the game would suggest a strategy conversation is needed, the audio channel between the two players can be automatically established.

In some configurations, game context information can be used from the other player, to determine if the other player wishes to have a conversation or is not interested in speaking with the player that is eye tracking the player's character or object in the game. When a conversation is started with another player, the conversation that is triggered can first be private, e.g., so other players don't hear the conversation. If the conversation is intended for a group of players, then the conversation audio channels can be extended to other players that may be in the same proximity of the eye gaze targeted area or proximity of the game scene. In one embodiment, sounds of the game can be reduced while the conversation occurs between the players, to make direct audio chat easier to hear.

It should be understood that "chat," as described in the various embodiments may be pure text chat, pure audio/voice chat, a mix of audio and text, audio/voice converted to text, audio converted to icons or graphics or gestures, text converted to audio/voice, or combinations thereof.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIGS. 1C-1 to 1C-4 illustrate various example ways of communicating recommendations and associated indicators of suggested chat to one of the players and ways for selecting efficient chat transmission, in accordance with multiple embodiments.

DETAILED DESCRIPTION

The following implementations of the present disclosure provide methods, systems, and devices for suggesting chat communication between players of a video game. In some embodiments, chat assistance is provided during game play of a game. The assistance is provided, in one embodiment, as a graphical indicator on the display of a first player. The graphical display may provide text that suggests to the first player to initiate chat communication with a second player. The method includes tracking a gaze focus of the first player and events occurring in the gameplay.

Based on processing the gaze focus and the events, the method is configured to surface an indicator that suggests initiating chat communication with a second player. In one embodiment, the second player is associated with a game character. If the gaze focus is directed toward the game character, for example, and an event is occurring that would benefit chat between the first player and the second player, the method may surface the indicator of the first player. In one configuration, the indicator will suggest the chat, and in other embodiments, the suggestion may include suggested text content to the first player to send to the second player. The suggested text content, in one configuration, may be contextually related to the game and/or the event detected in the game.

With the above overview in mind, the following provides several examples figures to facilitate understanding of the example embodiments.

Figure 1A:
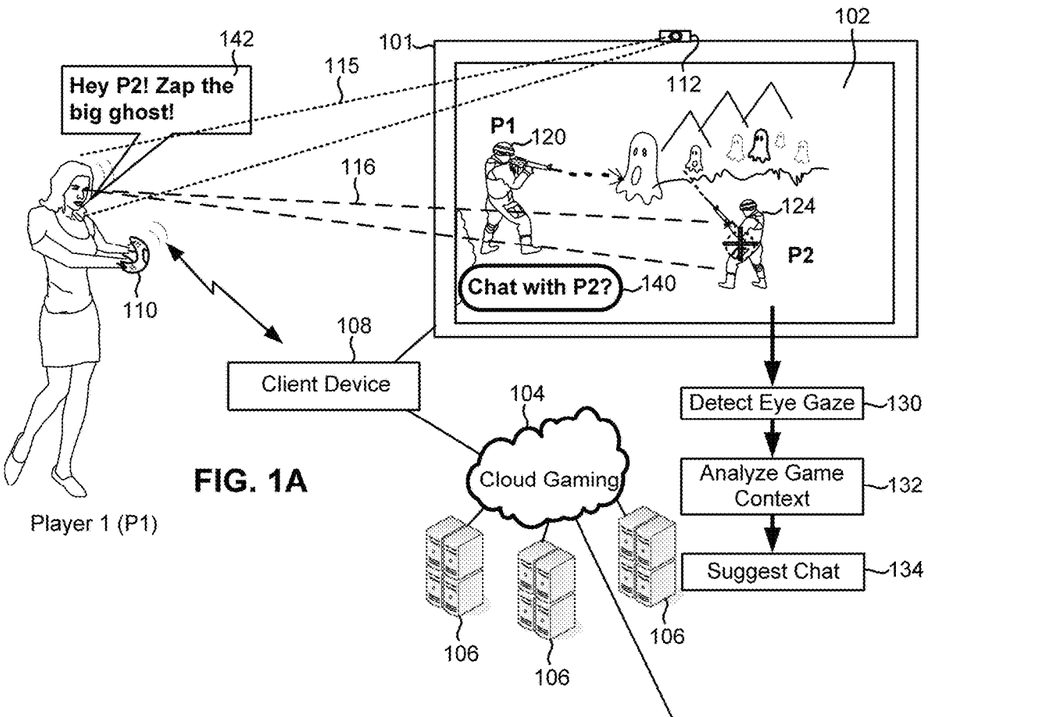
FIG. 1A illustrates a block diagram of gameplay execution of a video game, in accordance with one embodiment.

FIG. 1A illustrates a block diagram of gameplay execution of a video game 102, in accordance with one embodiment. As shown, the video game 102 is being played by a player P1 using a peripheral device 110 and the game is displayed on a display 101. In one configuration, the player P1 is connected to a client device 108, which communicates with peripheral device 110 for driving interactivity of the video game 102. In one configuration, the client device 108 is a local device, such as a personal computer, a game console, or an Internet connected device. In other configurations, instead of using a display 101, the method and system operations described herein may be implemented for headmounted display (HMD) embodiments. As shown, a cloud gaming system 104 may provide connection to servers 106 which enable online gaming or streaming of the video game 102. The cloud gaming system 104 may be located in a data center, where processing resources in the form of servers, memory, storage, and other networking may be located to facilitate the game logic for providing online gaming or streaming of games to remote client devices.

In one embodiment, a camera 112 may be provided to allow tracking of player P1 during gameplay. In one example, the tracking can include eye gaze tracking to identify the head 115 of the player P1 and eye movement directed toward the display 101. By way of example, the player P1 may have a gaze focused on specific graphics, locations of content, text, motion, or general gameplay environment regions that may be of interest during the gameplay by player P1. In one configuration, the gaze focus of the player P1 can be continuously tracked during the gameplay, to determine specific areas of interest on the display 101 as the interactive content changes during the gameplay of the game 102. As shown, gaze tracking can be facilitated using camera 112, or other cameras located in a real-world environment in which the player P1 is located. If the embodiment is an HMD environment, eye gaze tracking can be enabled by one or more cameras located within the housing of the HMD.

In this illustration, it is shown that player P1 has a gaze focus 116 directed toward 124 on the display 101, during interactive gameplay of the video game 102. In one embodiment, eye gaze 130 is processed and then game context 132 is analyzed to determine when to suggest a chat communication 134. By way of example, if the player P1 is focused on character 124 for a sufficient threshold period of time, and an event is identified to be occurring based on the game context 134 that is suggestive of a chat communication being established, and indicator 140 can be provided to the display 101. For instance, player P1 has been focused on character 124 either continuously or intermittently during a period of gameplay.

In some embodiments, the amount of time can vary based on the context of the game, such as shorter periods of time for rushed gaming activity or longer periods of time for more passive gaming activity, as identified by analyzing game state of the video game. In one embodiment, if the gaze focus of player P1 is directed toward character 124, which is controlled by player P2 for two to three seconds during a rushed gaming interactive sequence, then an indicator 140 may be displayed for player P1. The indicator may be a message, a floating menu, icons, graphics, sound, voice output, or a combination of two or more thereof. As shown, the indicator 140 may be a request to confirm that the player P1 wishes to chat with P2. If the player P1 confirms the intent to chat with P2, a communications channel is activated between player P1 and P2 automatically.

In this embodiment, the indicator 140 can be a request to confirm that P1 wishes to chat with P2, and P1 can confirm by providing one or more inputs. The one or more inputs can be voice input confirming that player P1 wishes to speak with P2, e.g. by speaking "yes", a specific input button on the controller 110, making a gesture, confirming with a head nod, or a combination of other inputs. The confirmation can simply be player P1 providing voice output that is communicated to player P2, responsive to indicator 140. As shown, player P1 upon scene indicator 140 may respond with "Hey P2! Zap the big ghost!". This response can be provided by the player P1 speaking responsive to the indicator, without specifically confirming that player P1 wishes to speak with player P2.

Figure 1B:
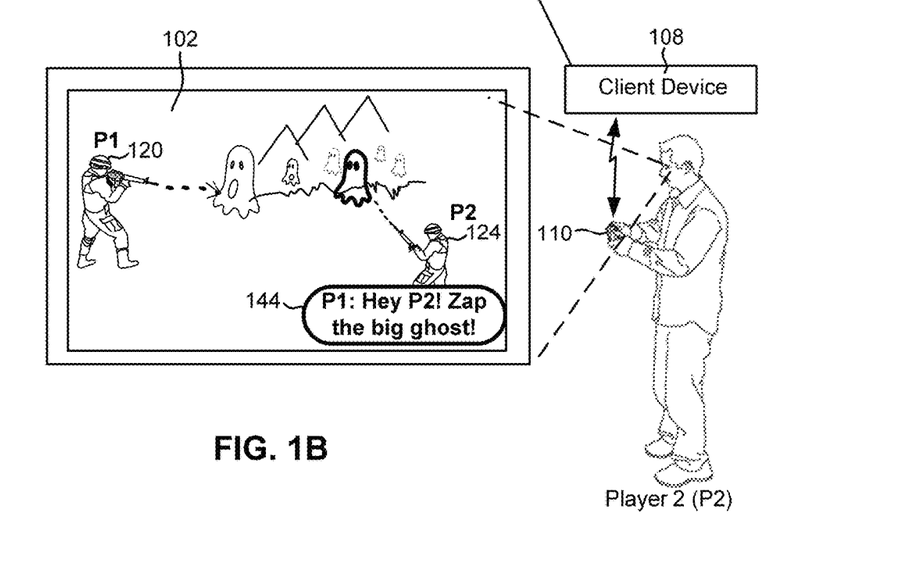
FIG. 1B illustrates an example of a second player, player P2 that may be engaged in gaming interactivity in an environment of video game, in a multiplayer mode, which can be a streaming configuration or an online configuration.

FIG. 1B illustrates an example of a second player, player P2 that may be engaged in gaming interactivity in an environment of video game 102, in a multiplayer mode, which can be a streaming configuration or an online configuration. As shown, player P2 may communicate using client device 108, which communicates with cloud gaming system 104, similar to the way player P1 communicates using client device 108 with cloud gaming system 104.

During gameplay by player P2, a message or indicator 144 can be displayed to allow player P2 to view a chat communication directed toward player P2 by player P1. In this example, a chat message from P1 reads "P1: Hey P2! Zap the big ghost!". This message is viewed by player P2, which then allows player P2 to move character 124 in a direction to zap the big ghost. In this configuration, the intent of player P1 to communicate with player P2 was derived by analyzing the gaze focus of player P1 and analyzing the game context to identify events occurring in the gameplay to determine that indicator 140 would be useful to initiate communication between player P1 and P2. In one embodiment, events occurring in the game 102 can be identified by determining that events have occurred or will occur based on analysis of the game state data.

The game state data can be continuously analyzed by one or more servers of the cloud gaming system 104. In this manner, it is possible for the cloud gaming system 104 to use logic for surfacing the indicators 140 and 144 to respective players during gameplay, as anticipatory and assistive chat suggestions between players, which will assist in the gameplay and will be welcomed by the respective players.

FIG. 1C-1 illustrates an example of chat communication being recommended between players P1 and P2 during gameplay. Continuing with the example of FIGS. 1A and 1B, player P1 may have a gaze focus directed toward character 124, which is controlled by player P2. During gameplay, analysis of contextual data generated during gameplay and the associated state data processed by servers of the cloud gaming system 104 or processed by compute associated with the client device 108, or a combination of both, will be used to determine that a recommendation for chat communication should be surfaced to player P1.

Figure 1C:
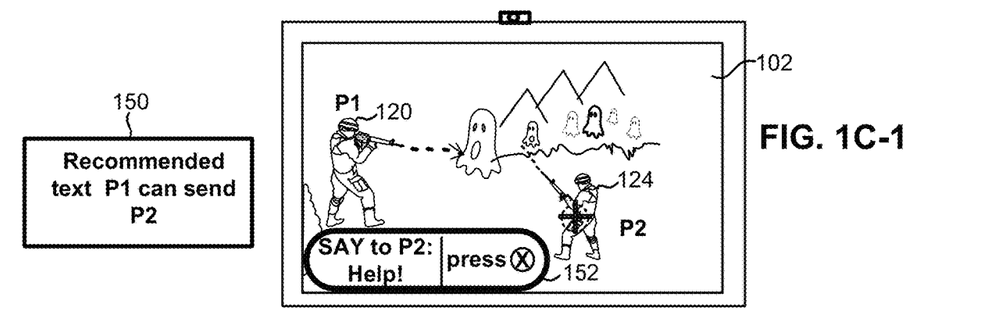

In this example, the recommended text surfaced in indicator 152 can be a message that allows player P1 to simply press a button to ask for help from player P2. In this example, the contextual information derived from the state data and the game state data associated with one or both of the players P1 and P2, will be used to determine that player P1 needs help from another player to succeed or proceed with a specific game task, game goal, or game objective. For example, player P2 can use character 124 two zap additional ghosts that may be chasing player P1, and the both player P1 and P2 can play more efficiently as a team.

The indicator 152 was generated automatically by logic that analyzes the gaze focus of the player P1 and events that are occurring in the gameplay in respect to the contextual gameplay of both players P1 and P2 and other objects that are viewable in the gaming environment and scenes of the game. It should be understood that the same types of recommendations would be possible for player P2 and other players that may be participating in a multiplayer game. However, for purposes of description, the focus is provided on providing player P1 with the indicators for communicating with player P2.

FIG. 1C-2 illustrates another example of a recommendation being provided in an indicator 156 the player P1, for initiating chat communication with P2, in a contextually processed determination, in accordance with one embodiment. In this example, the recommendation is generated responsive to player P1 having its gaze focus tracked and identified to be toward character 124 that is controlled by player P2. Additionally, the recommendation is generated based on processing state data to identify contextual information occurring in the gameplay.

Figure 1C:
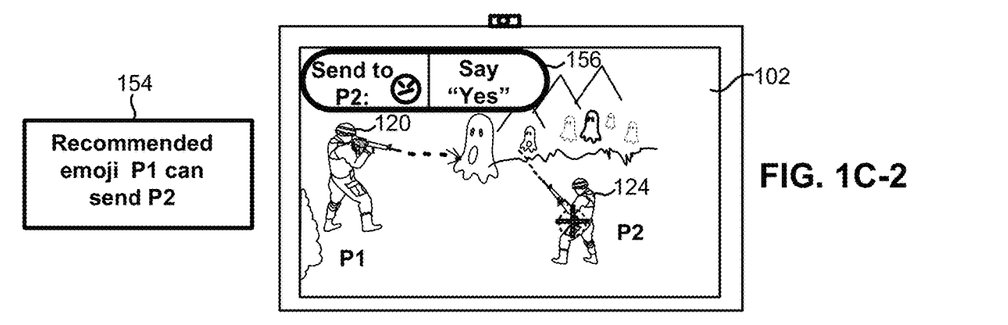

The contextual information occurring in gameplay may be that player P1 is losing the game and too many ghosts are attacking player P1, while player P2 is not providing sufficient assistance (in the predictive perspective of player P1). In this circumstance, the method may generate a recommendation of sending an emoji to the player P2. The indicator 156 may provide simple guidance to player P1 for accepting and simultaneously communicating with player P2, with the suggested emoji. In this example, the system may detect voice output of player P1 to respond to the indicator 156, such as by responding "yes."

Upon responding by player P1, the audio is received and processed by the local game computer and/or the server game computer to interpret the response and formulate the input of "yes", as responding to the indicator 156. In some embodiments, the logic for providing recommendations for chat communication, and making suggestions at different times of interactivity can be integrated as add-on logic to an existing game, or can be integrated with the native code of the video game. In some embodiments, the add-on logic can be processed by the local computer or can be processed by one or more servers of the cloud gaming system 104.

FIG. 1C-3 illustrates another embodiment where a recommendation 158 is provided to initiate chat communication between player P1 and P2 based on contextual analysis of events occurring in the gaming interactivity of the video game 102, in accordance with one embodiment. As shown, based on the analysis of contextual information gathered from the state data being generated during gameplay, the system will generate an indicator 164 display to player P1. The indicator 160, in this example, asks player P1 if player P1 wishes to send the player P2 a quick message of "Above you!".

Figure 1C:
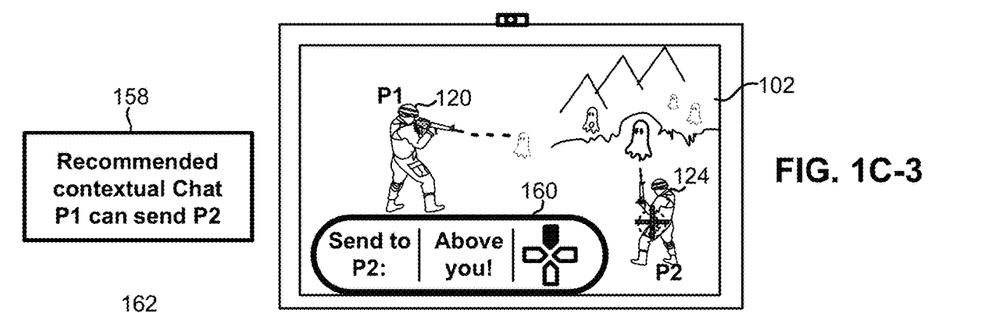

This message is in the form of a warning that can be sent by player P1 the player P2, to notify player P2 that a ghost is approaching from above, and player P2 may wish to quickly aim two zap the ghost that is approaching from above. In one configuration, player P1 may simply push the up arrow in the D pad of the controller 114, which immediately causes the chat notification to be rendered to player P2 as "Above you!". In this example, players P1 and P2 may be playing a multiplayer game individually or as a team.

By way of example, by providing the suggestive chat messages from one player to another, the team can progress in the gameplay more efficiently than without the benefit of the contextually recommended chat communication and chat content that is automatically generated based on the analysis of the context and processing of game state. In some embodiments, the processing of game state can be processed by a machine learning process. The machine learning process can be trained in order to generate a model of the specific game, to identify events that are occurring in specific games, and identify types of communications exchange between players in those type of games and those types of situations and contextual activity.

The machine learning process can include programming to extract features from the one or more gaming sessions and associated state data, to then process classifiers suitable for using the extracted features and learning relationships between activities and communications occurring in specific games and in specific game circumstances. Over time, the machine learning model can identify situations where multiple players would be engaged in interactivity and can then suggest specific types of chat communications and chat content for sending between players to assist in progressing games. In one embodiment, the feature of providing chat communication suggestions can be moderated by the player. By way of example, the player can determine to have more aggressive suggestions or less aggressive suggestions, depending on the skill level of the player and depending on the desire of the player to be provided with automatic recommendations and suggestions for initiating chat with other players.

FIG. 1C-4 illustrates another example of an indicator 164 being rendered on the display of the player P1, during game play. In this example, translated chat 162 is a functionality that allows the system to convert speech communication provided by player P1 into a format that is more specific to the type of game being played. In some embodiments, players may be new to specific games and will not understand the typical type of communication used by players in chat.

Figure 1C:
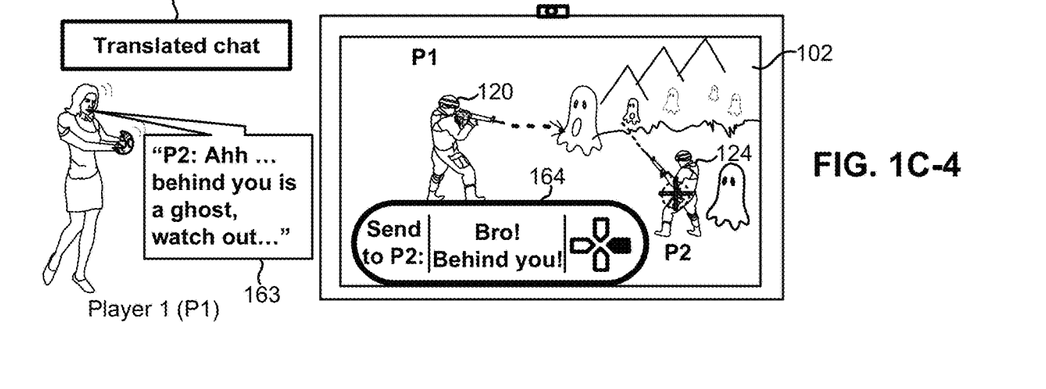

In one embodiment, speech communication provided by player P1 can be processed to identify a specific meaning or command or communication objective. This processing can be performed by converting the speech to text, and then processing the text to identify a grammatical and game context specific communication format. In the example shown, player P1 has provided voice output 163 that is processed. The voice output 163 is "P2: Ahh behind you is a ghost, watch out . . . ".

In one embodiment, the specific chat output can be literally sent to P2, responsive to player P1 sending a command by voice, press the button, or toggling a graphical input. In this example, the translated chat 162 functionality converts the chat 163 provided by voice of player P1 to a more game specific chat content, and provided as a suggestion in indicator 164. As shown, the indicator 164 says "Bro, Behind you!". In one embodiment, the translated chat 162 has identified the chat objective uttered by player P1, and condensed it into a very specific communication directed toward player P2. The indicator 164 shows that a simple right D pad input will send the chat communication the player P2.

In one embodiment, the contextual analysis of the gameplay and players will identify that player P2 is a male player, and other players may refer to player P2 as "Bro", and this chat referral to player P2 is generally invited and understood by player P2 in a positive form. Accordingly, the recommendations and translations can be custom tailored to specific players, based on machine learning of one or more prior sessions of their specific game play. In this manner, machine learning models can be personalized to specific players, so specific players can receive chat communication from others in a format that is invited, normal, and positive.

It should be understood that the recommendations provided by the method and systems described herein can take on many forms, and can be rendered as indicators on the display viewed by player P1, whether it be a general display such as a television, phone, tablet, a monitor, or an HMD.

Furthermore, translation chat features can be assisted features for players that may be handicapped and may not be able to enunciate or pronounce specific words or construct effective chat statements. The assistive and suggestive chat functionality will therefore allow for more expansive gaining by all players of different types, skill levels, handicaps, and will be presented in formats that are positive and helpful.

Figure 2:
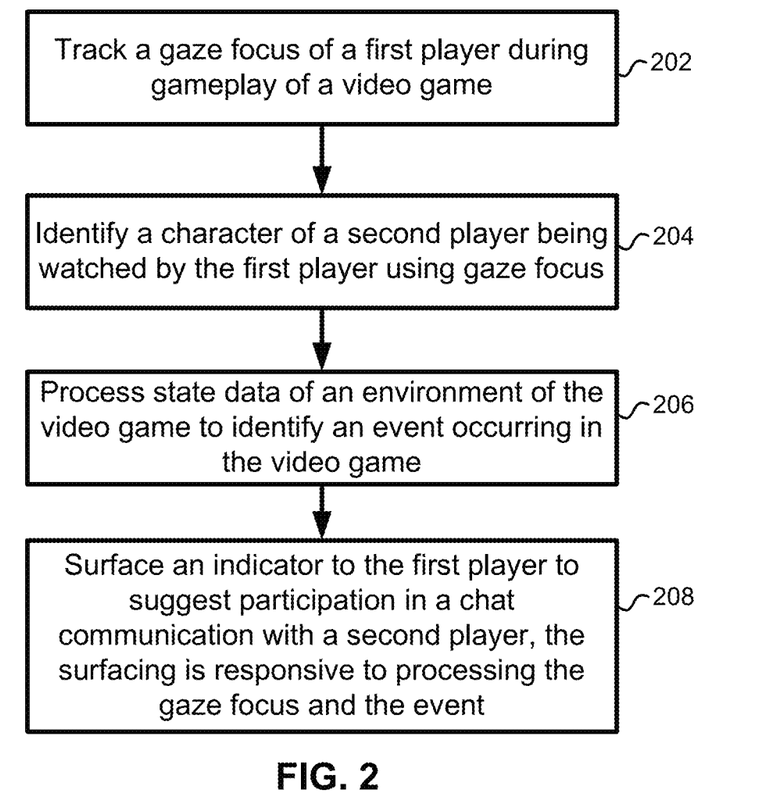
FIG. 2 illustrates one embodiment of a flow diagram associated with providing suggestive participation in chat communication between players, in accordance with one embodiment.

FIG. 2 illustrates one embodiment of a flow diagram associated with providing suggestive participation in chat communication between players, in accordance with one embodiment. In operation 202, a gaze focus of a first player is tracked during gameplay of a video game. In one embodiment, the gaze focus can be tracked using one or more cameras that are directed toward the face of a player.

In some embodiments, the cameras may be associated with a device or by a separate camera, or by cameras of an HMD housing. Gaze tracking is configured to focus on the eye movement of a player in reference to specific locations, areas, or objects displayed on the screen. In some embodiments, a calibration operation can be performed to enable the system to identify locations on the screen to which the user's eyes are directed toward. The calibration operation can be a separate process, or can be run in situ during gameplay and improved upon as the user moves the gaze focus to one or more objects, players, or regions of a display.

In one embodiment, operation 204 is processed to identify a character of a second player and determined that the first player is watching the character of the second player using analysis of the gaze focus. If the first player is focused on the character of the second player for a period of time, or tracks movements of the character of the second player during one or more periods of time, it can be determined that the first player has the gaze focus directed toward the character, which corresponds or is related to or controlled by the second player. In one embodiment, the method operation or processes can include processing of state data associated and/or generated by gameplay of the video game during a session by the first player and the second player and other players in a multiplayer environment.

Processing the state data of an environment of a video game will allow for identification of events that occur in the video game to be identified. In some embodiments, the events are identifiable events that are tagged by programming to signify achievements or event occurrences. For example, some events can include generating a score, achieving a trophy, advancing to the next level, interacting with another player, zapping targets, and the like. The type of events will be based on the type of game being played, and it should be understood that they will vary accordingly. In other embodiments, events can be identified based on the identifiable events discussed above, and/or in addition to interactivity occurring in the game by the one or more players. For example, if the players, e.g. the first player and the second player are moving toward a target, an event can be determined or assumed to be occurring in the game.

The event may not be predefined, but can be inferred from the actions occurring in the game based on the overall game context. Generally speaking, the game context will identify the activity occurring in the game, the conditions in the game, game assets being rendered in the game, game levels, scores, actions by one or more players, progression in a game, achievements, and the like. Collectively, game contacts can include many factors that identify generally what is occurring in the game and/or about to occur based on interactivity by one or more players. The game context can therefore be determined or predicted based on the game state being generated during the gameplay.

The game state is data that is saved and captured from all the activity that is occurring during the game context as it progresses throughout the game. By way of example, at any point in the game, a snapshot can be generated to identify the game state of all actions, game content, players, scores, achievements, number of players, levels, and the like. The game state data can then be saved and/or replayed at a later time if the game is paused, or resumed. Periodically, game state can be saved by the game system to identify a plurality of snapshots related to the game state, which will allow periodic analysis of game state that can be utilized for generating recommendations of chat communications.

In operation 208, an indicator is surfaced to the first player to suggest participation in a chat communication with the second player. In one embodiment, the surfacing is responsive to processing of the gaze focus and the event. An event can be one event or multiple events that are processed during tracking of the gaze focus. As mentioned above, the events can be identified from the state data and general context of the game when the gaze focus is identified to be directed toward a character, or an object that is associated with another player to which communication can be initiated.

In one embodiment, surfacing of an indicator can be triggered when conditions in the track gaze focus and the event or events signifies that a chat communication would be useful for communicating between players. The recommendation can be provided to one or both players or multiple players during the gameplay. The suggestive chat communication indicators can be in the form of messages, floating icons, audio messages, text, graphics, and combinations thereof.

Figure 3A:
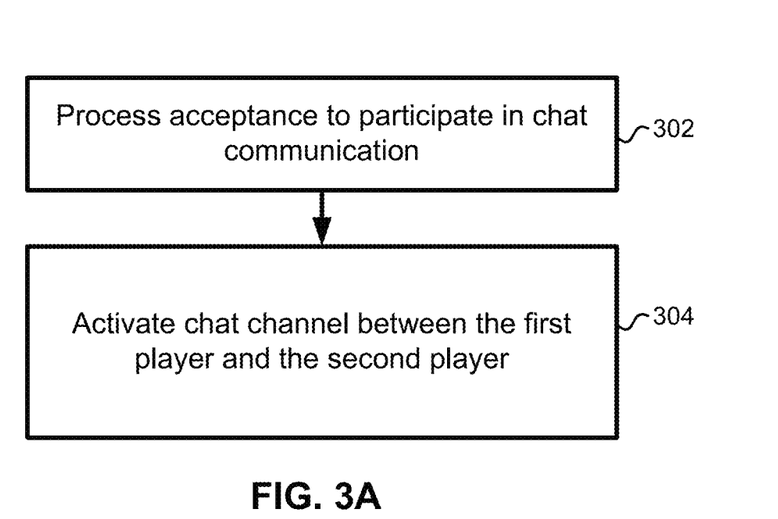
FIG. 3A illustrates a process that may be implemented in order to initiate communication with a second player, in accordance with one embodiment.

FIG. 3A illustrates a process that may be implemented in order to initiate communication with a second player, in accordance with one embodiment. In this embodiment, a process 302 may be executed to obtain acceptance from another player to participate in chat communication. For instance, player P1 may be provided with an indicator asking if player P1 wishes to chat with player P2, based on a determination that player P1 was focusing gaze at the character of player P2, and the game context suggests that chat communication would be optimal or received well in light of the game environment, the game scene, or the general context of the interactivity.

In one embodiment, the indicator provided to player P1 may be a graphical message on the display which asks P1 if chat is desired with P2. In another embodiment, the indicator can simply provide a suggested chat to send to P2. In this scenario, the acceptance is implicit because player P1 chose to send the suggested chat to P2. Conversely, if player P1 is first asked to confirm a desire to chat with P2, then another message or indicator can be rendered to allow activation of the chat channel between the first player and the second player in operation 304. If the acceptance is implicit, whereby player P1 simply sends a chat that is suggested or formulates a custom chat to P2, the chat channel is activated between player P1 and P2 automatically.

In some embodiments, activation of the chat channel can be private between player P1 and P2. In other embodiments, the chat channel can be made public so that other players in the game environment can view the chat communication between players P1 and P2. In still other embodiments, a request for permission to make a chat public may be requested of player P2 or player P1.

Figure 3B:
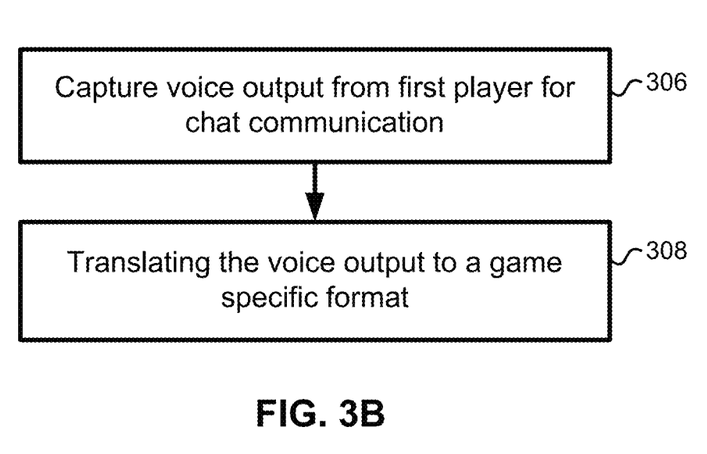
FIG. 3B illustrates an embodiment where voice output is captured from the first player for chat communication, in accordance with one embodiment.

FIG. 3B illustrates an embodiment where voice output is captured from the first player for chat communication, in operation 306. In one embodiment, a voice output from the first player can be captured using a microphone. The microphone can be integrated in a headset, or on a peripheral device, such as a controller. In other embodiments, microphones located in the real-world space in which the player is interacting with the game can capture the voice output. In this embodiment, the voice output by player P1 is translated to a game specific format in operation 308.

By way of example, the player can utter normal speech communication that is captured by the microphone, and then processed to determine the general context of the communication. As mentioned above, different games have different styles of communication, and if a new player does not utilize the customary chat format, the gaming environment will not be interesting to other players. In one embodiment, the translation can include correction of grammar. In another embodiment, the translation can convert a statement to another statement that is more suitable for the specific game.

For example, in a car racing game, a chat can request another player to assist in performing a pitstop in which car repairs are performed. A first player can say, "please help me with the oil change." The translation can take that statement and converted to, "stopping for a pitstop, service requested". In this example, other players are more familiar with the term "pitstop" and "service," but are not usually discussing "oil changes." As a result, the translation can assist in dynamically adjusting the chat communication to chat communication that is more specific to the type of game format. In still other embodiments, the translation can assist handicapped players to complete more accurate sentences. For example, a player with a stutter may be attempting to request service for the race car, but may only utter "Ssss . . . stop . . . forfor . . . for ssss . . . service." Analysis of the statement can be translated, for example to "stopping for a pitstop service" or something contextually related to the game and gameplay interactivity.

In one embodiment, determining how to translate stutters can utilize analysis of game context. The game context, as described above, can take into consideration the interactivity occurring in the game, such as the race car making laps, the race card meeting service, prior communication by the player, and machine learning to continuously learn the type of communication and appropriate translations for the specific player. Accordingly, it should be understood that the type of translation can be dynamically adjusted based on the game context as well as the user and historical types of communication and/or handicaps identified.

Figure 3C:
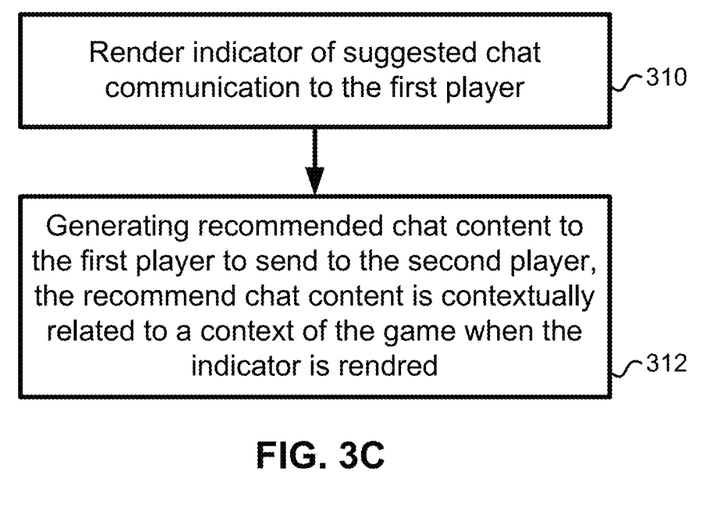
FIG. 3C is a flowchart diagram of types of indicators rendered to suggest chat communication to a first player, in accordance with one embodiment.

FIG. 3C is a flowchart diagram of types of indicators rendered to suggest chat communication to a first player, in accordance with one embodiment. In operation 310, in indicator is rendered to suggest chat communication to the first player responsive to analysis of the gaze focus of the first player and the current game context. Depending on the type of events that are occurring during the current game context, the indicator can provide a message to the first player to suggest chat with another player, such as a player having a character in the scene that the first player may be looking at. In one embodiment, the time that the first player is looking at the character can vary depending on the game context.

In some embodiments, if the gaze focus remains on the character for about two to six seconds, it can be interpreted that the first player wishes to communicate with the second player. In other fast-paced games, focusing the gaze for one to two seconds can be sufficient to trigger an inference that the first player wishes to chat communicate with the second player. In some games, the amount of time can be dynamically changing, based on the on-going circumstances occurring. If the game relates to quick decision making, and player P1 needs fast help from player P2, the gaze focus can be said to be triggered upon player P1 looking at the game character of player P2. In other games, such as poker, looking at the character of player P2, whom you are playing against, may not signal to initiate a chat. In the context of poker games, players usually stare at each other, but do not wish to chat. For this reason, the time window for classifying a gaze focus as being suggestive of chat communication will depend on the context and event(s) occurring in the game at the time specific gaze focus is detected throughout a gaming session.

In some embodiments, in addition to detecting the gaze focus directed toward another player's character or object, facial expressions made by the first player can also be considered.

In some embodiments, the first player may focus the gaze toward the character of the second player while also blinking. In other way of providing additional intent can be to monitor the eyebrows or head movements of the first player when the gaze focus is directed toward the character of the second player. In still other embodiments, facial expressions, head movements, body movements, controller movements, eye shape motions, voice outputs made, or combinations thereof can be used in addition to detecting the gaze focus and the context. In some embodiments, these other ways of providing ways to measure intent can be part of the overall context in which the first user is attempting to communicate or wishing to communicate with the second player.

In one embodiment, the computer or device utilized for enabling gameplay by the users will have a camera. The camera can be facing the user while the user plays the game. In some embodiments, more than one camera can be facing the user. In some cases, the cameras are built into the device, such as on a display screen. In other embodiments, a separate camera can be placed proximate to the display screen, so as to capture the user eyes for gaze detection. In another embodiment, the user may be interacting with a game utilizing a head-mounted display (HMD). The HMD can also include one or more cameras located within the HMD and facing the eyes of the user for gaze detection. The eyes of the user can therefore be tracked utilizing the gaze detection using video data captured by the camera(s) of the HMD. Accordingly, the embodiments described herein and the related eye gaze utilized for gaze input can be utilized in any type of hardware configuration.

In one configuration, eye gaze detection software is executed by the computer. The eye gaze detection software is configured to focus on the eyes of the user during the user's interaction and gameplay. Gaze detection is code that can be executed for the eye gaze detection software processing. Gaze detection can be a separate computing program run on the local device, or can be executed and run on a remote computer. Gaze detection is configured to focus on the eyes of the user during the user's gameplay and gameplay execution, that provides interactive scenes on a display screen. The user input device is utilized by the user, and the user space may be tracked using one or more other cameras. In one embodiment, the eye gaze detection generates information that characterizes the eye gaze of the user.

In some embodiments, gaze detection may include a verification process. For example, the verification can, in some configurations may determine if user has "lazy-eye" syndrome or nervous twitching/squinting that needs to be filtered-out before considering the eye gaze focus. In some embodiments, the direction of gaze can be analyzed prior to determining if the gaze data will be used for suggesting chat communication. Still further, body movements plus eye movements can be analyzed to interpret user intent, e.g., whether to enable said suggestive chat communication with one or more other players.

Figure 4:
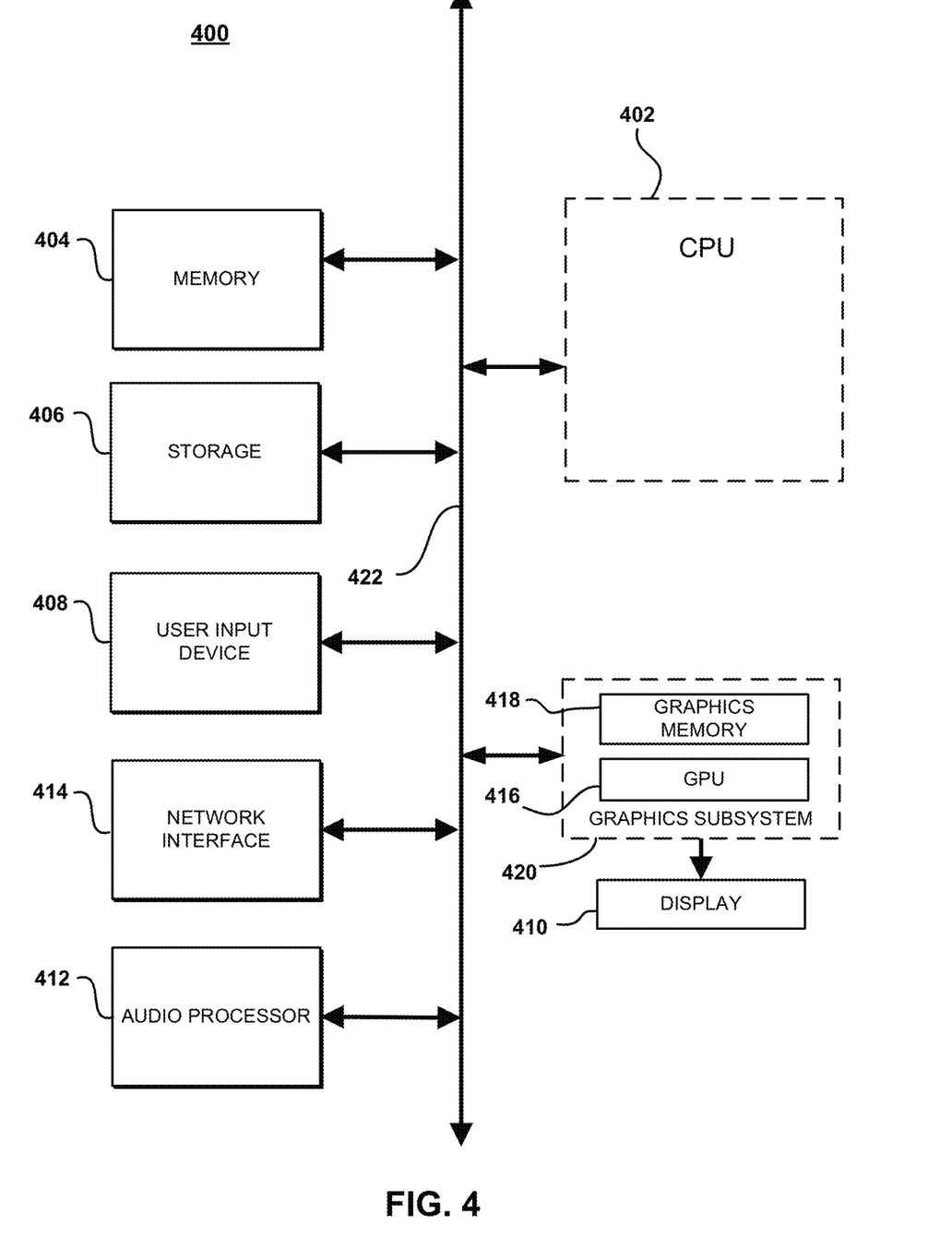
FIG. 4 illustrates components of an example device that can be used to perform aspects of the various embodiments of the present disclosure.

FIG. 4 illustrates components of an example device 400 that can be used to perform aspects of the various embodiments of the present disclosure. This block diagram illustrates a device 400 that can incorporate or can be a personal computer, video game console, personal digital assistant, a server or other digital device, suitable for practicing an embodiment of the disclosure. Device 400 includes a central processing unit (CPU) 402 for running software applications and optionally an operating system. CPU 402 may be comprised of one or more homogeneous or heterogeneous processing cores. For example, CPU 402 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 400 may be a localized to a player playing a game segment (e.g., game console), or remote from the player (e.g., back-end server processor), or one of many servers using virtualization in a game cloud system for remote streaming of gameplay to clients.

Memory 404 stores applications and data for use by the CPU 402. Storage 406 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 408 communicate user inputs from one or more users to device 400, examples of which may include keyboards, mice, joysticks, touch pads, touch screens, still or video recorders/cameras, tracking devices for recognizing gestures, and/or microphones. Network interface 414 allows device 400 to communicate with other computer systems via an electronic communications network, and may include wired or wireless communication over local area networks and wide area networks such as the internet. An audio processor 412 is adapted to generate analog or digital audio output from instructions and/or data provided by the CPU 402, memory 404, and/or storage 406. The components of device 400, including CPU 402, memory 404, data storage 406, user input devices 408, network interface 410, and audio processor 412 are connected via one or more data buses 422.

A graphics subsystem 420 is further connected with data bus 422 and the components of the device 400. The graphics subsystem 420 includes a graphics processing unit (GPU) 416 and graphics memory 418. Graphics memory 418 includes a display memory (e.g., a frame buffer) used for storing pixel data for each pixel of an output image. Graphics memory 418 can be integrated in the same device as GPU 408, connected as a separate device with GPU 416, and/or implemented within memory 404. Pixel data can be provided to graphics memory 418 directly from the CPU 402. Alternatively, CPU 402 provides the GPU 416 with data and/or instructions defining the desired output images, from which the GPU 416 generates the pixel data of one or more output images. The data and/or instructions defining the desired output images can be stored in memory 404 and/or graphics memory 418. In one embodiment, the GPU 416 includes 3D rendering capabilities for generating pixel data for output images from instructions and data defining the geometry, lighting, shading, texturing, motion, and/or camera parameters for a scene. The GPU 416 can further include one or more programmable execution units capable of executing shader programs.

The graphics subsystem 414 periodically outputs pixel data for an image from graphics memory 418 to be displayed on display device 410. Display device 410 can be any device capable of displaying visual information in response to a signal from the device 400, including CRT, LCD, plasma, and OLED displays. Device 400 can provide the display device 410 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experience. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as HTML, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method comprising:
   identifying a gaze focus of a first player, the gaze focus being toward a character in an environment of a video game
   identifying an event occurring in the environment of the video game;
   determining, based on data generated by a sensor, that the gaze focus is maintained on the character for at least a threshold period of time;
   detecting a player cue including at least one of a head movement, a facial expression, a body gesture, or a controller gesture of the first player; and
   surfacing an indicator to the first player that is suggestive of participating in a chat communication, wherein the surfacing is configured to be triggered upon detection of both the gaze focus of the first player for at least a threshold period of time, and the player cue being detected.

2. The method of claim 1, further comprising,
   receiving an accept response from the first player to participate in the chat communication with a second player; and
   activating a chat channel between the first player and the second player.

3. The method of claim 2, wherein while the chat channel is active, capturing voice output by the first player, the voice output is processed to text and included in a chat interface viewable by the second player.

4. The method of claim 3, wherein processing the voice output includes translating the voice output to a game specific format.

5. The method of claim 1, wherein determining that the gaze focus is toward the character includes analyzing a predictive cue of the first player, the predictive cue includes data associated with the first player moving the gaze focus to track the character for a threshold period of time.

6. The method of claim 5, wherein the predictive cue includes data associated with head movements of the first player while the gaze focus is toward the character.

7. The method of claim 1, wherein the event is contextually related to interactivity in the video game by the first player and a second player.

8. The method of claim 7, wherein the indicator includes text viewable by the first player, and the text includes recommended chat content to be used in the chat communication.

9. The method of claim 8, wherein the recommended chat content includes one or both of text and graphics, the recommended chat content is related further contextually related to the interactivity in the video game.

10. The method of claim 1, wherein data from the environment of the video game is processed by a machine learning algorithm to identify said event and other events, the machine learning algorithm is trained using prior gameplays of the video game by one or more users.

11. The method of claim 1, wherein the indicator is one of a message, graphical user interface, an icon, a graphic, a graphic and audio tone, an audio sound, a banner, a haptic feedback to a controller of the first player, or a combination of two or more thereof.

12. The method of claim 1, wherein the gaze focus of the first player is captured using one or more cameras.

13. The method of claim 1, further comprising,
continuing to surface said indicator one or more times during gameplay of the video game.

14. Non-transitory computer-readable media having stored thereon program instructions that, when executed by at least one processor, cause the processor to perform a method comprising:
identifying a gaze focus of a first player, the gaze focus being toward a character in an environment of a video game
identifying an event occurring in the environment of the video game;
determining, based on data generated by a sensor, that the gaze focus is maintained on the character for at least a threshold period of time;
detecting a player cue including at least one of a head movement, a facial expression, a body gesture, or a controller gesture of the first player; and
surfacing an indicator to the first player that is suggestive of participating in a chat communication, wherein the surfacing is configured to be triggered upon detection of both the gaze focus of the first player for at least a threshold period of time, and the player cue being detected.

15. The non-transitory computer readable media of claim 14, wherein while the chat communication is active, capturing voice output by the first player, the voice output is processed to text and included in a chat interface viewable by a second player.

16. The non-transitory computer readable media of claim 15, wherein processing the voice output includes translating the voice output to a game specific format.

17. The non-transitory computer readable media of claim 14, wherein determining that the gaze focus is toward the character includes analyzing a predictive cue of the first player, the predictive cue includes data associated with the first player moving the gaze focus to track the character for a threshold period of time.

18. The non-transitory computer readable media of claim 17, wherein the predictive cue includes data associated with head movements of the first player while the gaze focus is toward the character.

19. The non-transitory computer readable media of claim 14 wherein the indicator includes text viewable by the first player, and the text includes recommended chat content to be used in the chat communication.

20. The non-transitory computer readable media of claim 14, wherein data from the environment of the video game is processed by a machine learning algorithm to identify said event and other events, the machine learning algorithm is trained using prior gameplays of the video game by one or more users, and wherein the indicator is one of a message, graphical user interface, an icon, a graphic, a graphic and audio tone, an audio sound, a banner, a haptic feedback to a controller of the first player, or a combination of two or more thereof.

* * * * *